Patented Aug. 1, 1939

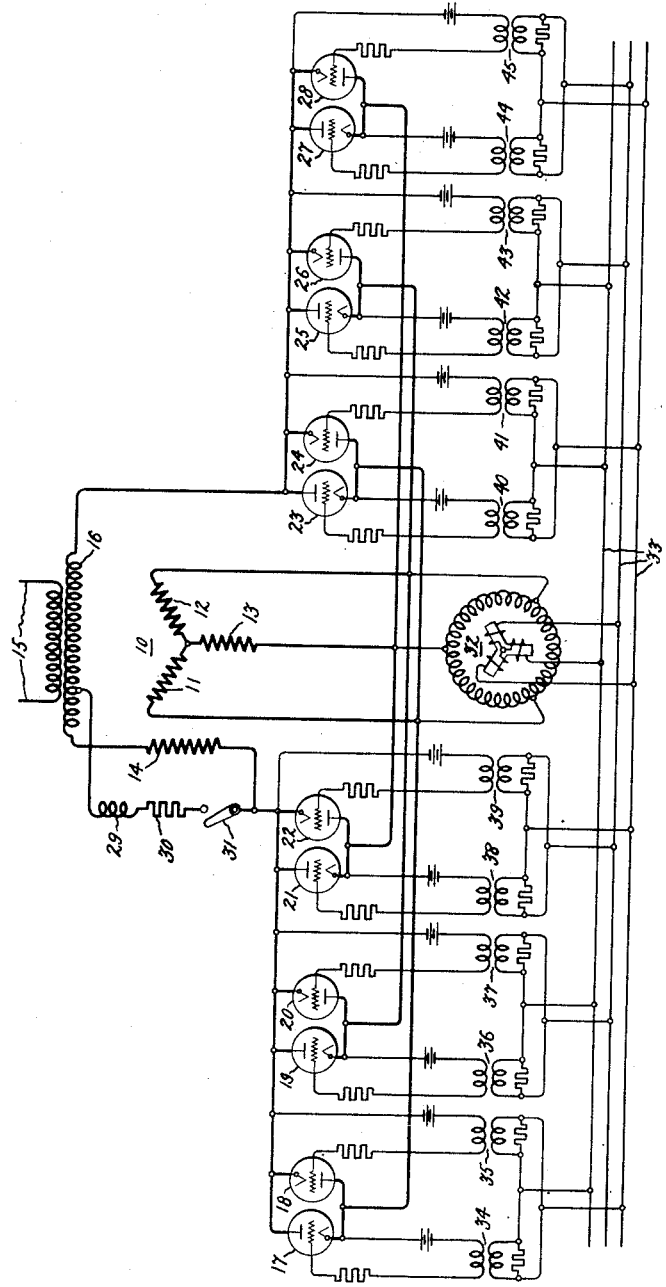

2,168,170

UNITED STATES PATENT OFFICE 2,168,170

CONTROL SYSTEM

Albert H. Mittag, Schenectady, N. Y., assignor to General Electric Company, a corporation of New York Application March 31, 1938, Serial No. 199,154

8 Claims. (Cl. 172—274)

My invention relates to an improvement in a control system for a dynamo-electric machine and more particularly to such control systems of alternating current dynamo-electric machines in which the current through the armature winding is controlled by an electric valve converting apparatus.

Heretofore the speed of dynamo-electric machines has been controlled by utilizing an electric valve converting apparatus to supply to the armature windings of the machine an alternating current of varying frequency. The valves of such apparatus generally have been controlled by a circuit utilizing a distributor mechanism which was operated either by the dynamo-electric machine or an auxiliary synchronous machine. A field winding in such machine generally has been energized with direct current or unidirectional current. In such arrangements it has been common to supply half wave unidirectional current impulses to the phase or armature winding by connecting the armature winding in star relation and arranging the field winding in series with the neutral connection of the armature winding. In some arrangements two or more star connected groups were provided as armature windings and the field winding was connected in series between these armature groups. However, where full wave alternating current energization of the armature winding was desired it has generally been necessary either to supply shunt energization of the field winding or to arrange a specially wound field winding or provide auxiliary synchronous commutator devices or switches.

It is apparent that it would be desirable to provide an arrangement wherein full wave alternating current energization of the armature winding may be had together with series excitation of the field winding without utilizing such specially wound field structures or auxiliary devices.

It is therefore an object of my invention to provide an improved control system for operating a dynamo-electric machine at variable speeds which will overcome the above-mentioned disadvantages of the arrangements of the prior art and which will be simple and reliable in operation.

It is another object of my invention to provide an improved control circuit for a dynamo-electric machine in which the armature windings thereof are supplied with full wave alternating current of variable frequency and in which the field windings may be energized in series relation.

It is still another object of my invention to provide an improved control circuit for dynamo-electric machines wherein the armature windings are supplied by a variable frequency by means of an electric valve converting apparatus, the valves of which are controlled by a static control circuit.

Still another object of my invention is to provide an improved starting arrangement for a dynamo-electric machine where the field winding of the machine is energized by a single phase alternating current and the armature windings are energized by a polyphase alternating current.

For a better understanding of my invention, together with other and further objects thereof, reference is had to the following description taken in connection with the accompanying drawing and its scope will be pointed out in the appended claims. The single figure of the drawing illustrates an arrangement embodying my invention for operating a dynamo-electric machine having a plurality of phase windings and a field winding at variable speed from a single phase alternating current supply circuit.

Referring now more particularly to the drawing, there is illustrated an arrangement for operating at variable frequency a dynamo-electric machine 10 having a plurality of phase windings 11, 12 and 13 and a field winding 14. The field winding 14 is supplied with single phase alternating current and the various phase windings are supplied by polyphase alternating current all obtained from a source of single phase alternating current 15. The single phase alternating current circuit 15 is connected to a transformer or inductive winding 16 which winding is connected in series relation with the field winding 14 of the motor 10. The inductive winding 16 and the field winding 14 of the dynamo-electric machine or motor are included in an electric valve converting apparatus comprising six pairs of tubes 17, 18; 19, 20; 21, 22; 23, 24; 25, 26; and 27, 28. The valves of each pair of valves are arranged in opposition to each other so that the cathode of one of the valves is connected to the anode of the other valve. Thus the cathodes of the valves 18, 20 and 22 together with the anodes of the valves 17, 19 and 21 are connected to one terminal of the field winding 14. Similarly, the anodes of valves 23, 25 and 27 and cathodes of the valves 24, 26 and 28 are all connected together to one terminal of the inductive winding 16. The anodes of the valves 18 and 24 and cathodes of the valves 17 and 23 are connected together to one terminal of the phase winding 11 of the dynamo-electric machine 10. Similarly, the cathodes of the valves 19 and 25 and anodes of valves 20 and 26 are connected together to one terminal of the phase winding 12 and the cathodes of the valves 21 and 27 and anodes of valves 22 and 28 are connected together to one terminal of the phase winding 13. A starting circuit for the motor is provided which includes an inductive winding 29, a resistor 30 and a suitable switch 31. This circuit is arranged to be connected in parallel with the field winding 14 of the dynamo-electric machine 10 and a portion of the inductive winding 16. During the starting period of the dynamo-electric machine 10 the switch 31 is closed so that the current flowing through the field winding 14 will induce a voltage in the phase windings, which voltage is impressed upon the phase shifting device 32 to initiate a discharge in the proper valves.

Each of the control circuits for the valves 17 to 28 inclusive includes a suitable source of biasing potential, a current limiting resistor and an inductive winding forming one portion of a suitable control transformer. The various control transformers are energized with the potential appearing across the phase windings 11, 12 and 13 of the dynamo-electric machine 10 by means of a suitable phase shifting device 32, the secondary winding of which is connected to the polyphase circuit 33. Each pair of valves 17 to 28, respectively, is provided with a pair of control transformers 34, 35; 36, 37; 38, 39; 40, 41; 42, 43; 44, 45; respectively, each pair of transformers being energized from a different phase of the polyphase circuit 33.

For the purposes of simplicity in setting forth the invention the valves 17 to 28 inclusive have been shown as comprising an anode, a cathode and a control grid contained within an envelope, but it will be understood by those skilled in the art that any other suitable electric valves may be utilized although it is preferable to utilize those types having an anode, a cathode and a control member or starting electrode and the envelope of which is filled with an ionizable medium. It furthermore will be apparent to those skilled in the art that the phase windings 11, 12 and 13 of the dynamo-electric machine could be arranged in delta instead of the star connection shown.

For purposes of explanation of the operation of the control system it will be assumed that the rotatable field winding 14 of the dynamo-electric machine 10 is in the position shown in the drawing. The current flowing through the field winding 14 induces a voltage into the armature phase windings 11, 12 and 13 so as to impress a potential upon the phase shifting device 32 which potential serves to energize the polyphase circuit 33. The energization of the polyphase circuit 33 causes the proper pairs of valves to be rendered conductive so that, for example as the left-hand terminal of the inductive winding 16 is positive current flows through the valve 19, phase windings 12 and 11 and through valve 24 to the other side of the inductive winding 16. The resultant flux component due to the current flow through the phase windings 11 and 12 is at right angles to the flux produced by the current flowing through the field winding 14. If the rotation of the field winding 14 is relatively slow the right-hand terminal of the inductive winding may become positive before current is commutated from one group of valves to another group of valves and hence during the next succeeding period current will flow from the right-hand terminal of the inductive winding 16 through valve 23, through phase windings 11 and 12, valve 20, through field winding 14 to the left-hand terminal of inductive winding 16. During the succeeding time interval when current is flowing through the phase windings 12 and 13 it will be apparent to those skilled in the art that one of the valves in each of the pairs of valves 19, 20; and 27, 28 will be rendered conductive. Similarly, during a succeeding time interval during which current is flowing through the phase windings 11 and 13 one of the valves of each of the pairs of valves 17, 18 and 27, 28 will be rendered conductive. If current now flows in the opposite direction through phase windings 11 and 12, current will be conducted by one of the valves in each of the pairs of valves 17, 18; and 25, 26. If current now flows in the opposite direction through phase windings 13 and 12 current will be conducted by one of the valves in each of the groups 21, 22 and 25, 26. Similarly, if current flows through phase windings 13 and 11, current will be transmitted by one of the valves of the pairs of valves 21, 22; and 23, 24. It will be apparent to those skilled in the art that during the starting operation with the switch 31 closed, the current flowing through the loop circuit comprising the field winding 14, the resistor 30, inductor 29 and a portion of the inductive winding 16 is such as to cause to be induced in the armature winding of dynamo-electric machine 10 sufficient potential to produce a potential in the phase shifting device 32. This potential is transmitted to the polyphase circuit 33 so that the proper valves are rendered conductive. When the field winding 14 is rotating the switch 31 is opened and the dynamo-electric machine tends to increase in speed. This speed, however, is controlled by the proper adjustment of load and impressed voltage. It furthermore will be apparent to those skilled in the art that after the starting operation has been completed the voltages appearing across the armature phase windings of the dynamo-electric machine 10 are such as to cause the proper valve to be rendered conductive in proper sequence thereby supplying polyphase alternating current to the armature winding of the dynamo-electric machine 10 while the field winding thereof is being energized by the single phase alternating current flowing through the inductive field winding 14.

While I have shown and described my invention as applying to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. The combination comprising a dynamo-electric machine provided with a field winding and a plurality of phase windings, a source of single phase current, electric valve converting means connected to said source and in series with said field winding for supplying said latter windings with a polyphase alternating current, and means for supplying said field winding with a single phase alternating current prior to supplying current to said phase windings for starting said electric valve converting apparatus and said machine.

2. The combination comprising a source of single phase alternating current, a dynamo-electric machine having a field winding and a plurality of phase windings, an electric valve converting apparatus connected to said source for supplying polyphase alternating current to said phase windings, and means for supplying single phase alternating current to said field winding for starting said electric valve converting apparatus and said machine.

3. The combination comprising a dynamo-electric machine having a field winding and a plurality of phase windings, a source of single phase alternating current, an electric valve converting apparatus connected to said source for supplying polyphase alternating current to said latter windings, means connecting said field winding in series between said source and said converting apparatus, and means for supplying alternating current to said field winding for starting said converting apparatus.

4. The combination comprising a dynamo-electric machine having a field winding and a plurality of phase windings, a source of single phase alternating current, an electric valve converting apparatus including a plurality of controlled electric valves energized from said source and operating to supply polyphase alternating current to said phase windings, a static control circuit for said valves, said circuit being energized from the potential appearing across said phase windings, and means for supplying single phase alternating current to said field winding.

5. The combination of a dynamo-electric machine having a field winding and a polyphase armature winding, a source of single phase alternating potential, an electric valve converting apparatus including a plurality of controlled electric discharge valves, said apparatus being energized from said source and arranged to supply polyphase alternating potentials to said armature windings, a static control circuit for said valves, means including a phase shifting device for energizing said control circuit with the potentials appearing across said armature windings, and means connecting said field winding in series with said source and said converting apparatus.

6. The combination comprising a dynamo-electric machine having a field winding and a plurality of phase windings, a source of single phase alternating current, an electric valve converting apparatus including a plurality of controlled electric valves arranged to be energized from said source said apparatus operating to supply polyphase alternating current to said phase windings, a static control circuit for said valves, said circuit being energized from the potential appearing across said phase windings, means connecting said field winding in series with said source and said converting apparatus, and means for initially supplying a reduced single phase potential to said field winding for starting said valve converting apparatus.

7. The combination comprising a dynamo-electric machine comprising a field winding and a plurality of phase windings, an inductive winding, a source of single phase alternating current arranged to energize said inductive winding, means connecting said field winding in series with said latter winding, an electric valve converting apparatus including said series connected windings for supplying polyphase alternating current to said phase windings, and means comprising an impedance circuit arranged to be connected in parallel with said field winding and a portion of said inductive winding for supplying single phase alternating current to said field winding thereby to induce a voltage in said phase windings to start said valve converting apparatus and said machine.

8. The combination comprising a dynamo-electric machine having a field winding and a plurality of phase windings, an inductive winding, a source of single phase alternating current arranged to energize said inductive winding, means connecting said field winding in series with said inductive winding, an electric valve converting apparatus including said inductive winding and said field winding together with a plurality of controlled electric discharge valves, a control circuit for said valves, said apparatus being arranged to supply polyphase alternating current to said phase windings, means for energizing said control circuit in accordance with the potential appearing across said phase windings, and means for starting said machine comprising an impedance circuit arranged to be connected from an intermediate point on said inductive winding in parallel with a portion of said inductive winding and said field winding to induce a voltage in said phase windings.

ALBERT H. MITTAG.